(12) United States Patent
Do et al.

(10) Patent No.: US 7,685,020 B2
(45) Date of Patent: Mar. 23, 2010

(54) MOBILE COMMERCE RECEIPT SYSTEM

(75) Inventors: Thanh Van Do, Oslo (NO); Knut Brandrud, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2206 days.

(21) Appl. No.: 10/275,697

(22) PCT Filed: May 4, 2001

(86) PCT No.: PCT/SE01/00975

§ 371 (c)(1), (2), (4) Date: Nov. 8, 2002

(87) PCT Pub. No.: WO01/86538

PCT Pub. Date: Nov. 15, 2001

(65) Prior Publication Data

US 2003/0110138 A1 Jun. 12, 2003

(30) Foreign Application Priority Data

May 8, 2000 (NO) .................................. 20002388

(51) Int. Cl.
G06Q 30/00 (2006.01)
G06Q 10/00 (2006.01)

(52) U.S. Cl. ......................................... 705/26; 705/28

(58) Field of Classification Search .............. 705/26–28
See application file for complete search history.

(56) References Cited

U.S. PATENT DOCUMENTS

| | | | |
|---|---|---|---|
| 5,557,518 A * | 9/1996 | Rosen | 705/69 |
| 5,897,620 A | 4/1999 | Walker et al. | |
| 5,903,721 A | 5/1999 | Sixtus | |
| 5,915,022 A | 6/1999 | Robinson et al. | |
| 5,948,040 A | 9/1999 | DeLorme et al. | |
| 6,094,640 A | 7/2000 | Goheen | |
| 6,561,951 B2 | 5/2003 | Cannon et al. | |
| 6,791,450 B2 | 9/2004 | Gokcebay et al. | |
| 6,862,576 B1 | 3/2005 | Turner et al. | |
| 6,868,391 B1 * | 3/2005 | Hultgren | 705/26 |
| 6,974,079 B1 | 12/2005 | Strothmann et al. | |
| 7,050,993 B1 * | 5/2006 | Piikivi et al. | 705/26 |
| 7,158,948 B1 * | 1/2007 | Rodriguez et al. | 705/28 |
| 7,159,116 B2 * | 1/2007 | Moskowitz | 713/176 |

FOREIGN PATENT DOCUMENTS

| | | |
|---|---|---|
| EP | 0969430 A1 | 1/2000 |
| WO | 9966436 A1 | 12/1999 |
| WO | 0075834 A2 | 12/2000 |

OTHER PUBLICATIONS

Steller, "Receipt city joins Digital Receipt Alliance", Crossvue (on line), May 1, 2000.*
Steller, "Receiptcity Joins Digital Recipt Alliance", Crossvue (on line), May 1, 2000; Retrieved from the internet: <URL:http://www.crossvue.com/newsmay.1.00.html>.

* cited by examiner

Primary Examiner—Matthew S Gart
Assistant Examiner—Garcia Ade
(74) Attorney, Agent, or Firm—Nixon & Vanderhye P.C.

(57) ABSTRACT

A mobile commerce receipt system and method providing a user of a mobile telecommunications terminal with a reliable electronic proof of reservation, purchase and/or payment made. By e-commerce means, the user places an order with a vendor or merchant and makes electronic payment. The vendor issues an electronic contract, sending the contract to a Trusted Third Party (TTP) receipt server. The TTP validates the contract, generates an electronic, digital receipt which is to sent the vendor. The vendor sends the receipt to the mobile terminal of the user, the mobile terminal storing the receipt for subsequent presentation at the point of delivery of the ordered goods or services.

19 Claims, 3 Drawing Sheets

MOBILE COMMERCE RECEIPT SYSTEM

This application is the U.S. national phase of international application PCT/SE01/00975 filed 04 May 2001, which designated the U.S.

TECHNICAL FIELD

The invention relates to the field of mobile telecommunications services, particularly a system, and a method for use in said system, for providing to a user of mobile telecommunications a receipt or proof confirming a purchase, payment and/or other e-commerce transaction made by the user.

BACKGROUND

Mobile e-commerce can be defined as commerce for mobile users made available via mobile devices such as mobile phones, PDAs (Personal Data Assistant), palmtop, etc. The mobile user has the possibility to do shopping, ticketing, banking, betting, trading via his mobile phones.

In web commerce goods, except electronic ones or services, are usually delivered later on. With mobile e-commerce, the user should be able to access the same commerce services with postponed delivery as the web but in addition, he must be able to access commerce services with short time delivery. For example, a user when on the move and thirsty, wants to get the soft drink from the automat right after having paid via his mobile phone. Another mobile user when visiting a city and wanting to see a movie expects to be able to collect the ticket at least before the beginning of the show.

In such situations, the entity performing the actual delivery, that could be a human being or a machine, needs to receive the authorisation for delivery quite rapidly. In addition, as in the case of the cinema ticket, the user needs to receive some sort of electronic receipt that he shows to the delivery entity to get the cinema ticket. Such an electronic receipt must fulfil the requirements:

- It needs to be recognisable by the delivery entity
- It can be used as a proof to show that the holder of the receipt has made the purchase and that the ordered goods and/or services can be delivered to the holder
- It cannot be falsified
- It cannot be duplicated or used twice Accordingly, there is a need for a receipt system in mobile e-commerce.

International patent publication number WO99/66436 discloses an electronic verified payment system (VPS) comprising a distributed verified trusted third-party system and method enabling electronic/digital transactions through real-time verification and authentication. The VPS includes hubs storing client data and connecting clients, such as users of mobile phones, palm-tops and digital television, to vendors to mediate secure electronic transactions. International patent publication number WO98/43211 discloses a digital payment transactions system wherein a broker generates and stores a secret number to be the start number for a chain of hash values by successive operations of a hash function. The values are associated with coins in a coin stick provided by the user, enabling secure payments in subsequent electronic transactions involving payments. Other systems and/or methods for electronic payments, of which some utilise a third party or a mediator, are disclosed in EP-A1-0865010, WO99/46720, U.S. Pat. No. 5,999,596, WO99/49404 and EP-A1-0971302. None of these, however, provide the user with a specific and reliable proof of the transaction made.

Other known systems for purchasing cinema tickets by telecommunication means, such as the one offered by Telenor Mobile in Norway, have only a very primitive scheme for receipt. After that the user confirms the acquisition of the tickets by entering through a telephone his PIN (Personal Identification Number) code, the user will receive a code, e.g. a 4 or 6 digit number. To collect his cinema tickets, the user presents the code at the ticket window. The ticket window attendant then compares the code presented by the user with one received from the system. If they match, then the attendant is authorised to hand out the purchased tickets to the user.

An example of an existing mobile e-commerce is depicted in FIG. 1. The user uses a mobile phone equipped with a browser, e.g. a WAP (Wireless Application Protocol) browser or a SIM (Subscriber Identification Module) Application toolkit browser, etc. allowing the user to browse on the World Wide Web via a gateway. The gateway can be a WAP gateway, an SMS (Short Message Service) gateway or any specific server capable of communicating with the browser on the mobile phone. The user visits a merchant's or vendor's web site. He contemplates the offers and selects the items that he wants. He pays for them through a payment scheme. The payment scheme may be for example based on a prepaid account, a credit or debit card or a bank account. He receives from the merchant a code that he can present when collecting the purchased items.

Such a system is simple but relies totally on the reliability of the merchant's system. It is only satisfactory if the delivery entity gets both the correct code and the correct information about the ordered tickets, e.g. theatre, movie, seats, etc. Otherwise, the user s will not receive the tickets that he has paid for. In case of failure, the user has only a code that is insufficient to prove that he has bought the tickets. Of course he will not be charged for the tickets in such a situation but this is not what he wants. It is quite frustrating not be able to watch the movie that one likes and has paid for.

As stated above, the current solution with a simple code is not sufficient since the user has to rely totally on the reliability of a vendor or merchant, and her/his system. Although the merchant may be honest and does not have the intention to play tricks on the user, if a fault occurs in his system the user will not get delivered the goods or services that actually has been bought, and usually paid for. Also, a mismatch between the ordered goods or services and what is actually delivered to the user can occur.

SUMMARY

Ideally, a contract stating all the details of the deal, i.e. the goods and/or services ordered, prices and quantity, etc. should be signed digitally by the merchant and then sent to the user mobile phone for local storing in the phone. At the delivery counter, the user can connect his phone via for example a cable, a socket or wireless using Bluetooth or IEEE 802.11 to the delivery system and hand over the signed contract. The delivery entity verifies the signed contract and if valid delivers the goods and/or services to the user.

To realise such an ideal solution, certain adaptations of the existing technology should be made to meet the demands of the ideal solution. Aspects to consider in this regard are:

- A detailed digital contract is rather large and the mobile phone may not have sufficient storage capacity for storing multiple contracts, which is necessary when the user buys several items.
- If the mobile phone is broken or stolen the user will loose all his contracts and hence may also loose all his purchase. Of course, the user can always claim to the merchant but it's up to the merchant to decide.

The delivery entity must have sufficient capability to verify rapidly the digital contract and this could be unacceptable from the economical point of view.

In some situations, the merchant having the deal with the user may not be the same as the delivery entity and a contract showing all the details about the user, address, prices, etc. may be inappropriate since the user's privacy can be a concern.

The present invention provides an arrangement for providing mobile commerce receipts to e-commerce users.

A method of providing a mobile telecommunication terminal (MTT) of a customer entity (CE) with a reliable simpler electronic proof of a reservation, purchase and/or payment being made by the CE by means of an e-commerce arrangement, including the steps of:

making, by the CE, a goods or service specifying electronic reservation, purchase and/or payment with a merchant entity (ME), generating, in the ME, a transaction record (TR) on basis of the reservation, purchase and/or payment, and, on basis of the TR, an electronic contract (EC) including an identity (ID) of the ME, transferring a copy of the EC from the ME to a trusted third party entity (TTPE), generating, in the TTPE, a verified EC (VEC) on basis of a verification of the ID of the ME included in the EC, and a simpler electronic receipt (SER) on basis of the VEC, transferring a copy of the SER from the TTPE to the ME, and transferring a copy of the SER from the ME to the MTT.

A method of using a simpler electronic receipt (SER) generated by a trusted third party (TTPE) and provided to a mobile telecommunication terminal (MTT) of a customer entity (CE) who has made an electronic reservation, purchase and/or payment by means of an e-commerce arrangement, for claiming a reserved, purchased and/or paid goods or service, including the steps of:

presenting the SER to a delivery entity (DE) by transferring a copy of the SER from the MTT to the DE, transferring a copy of the SER from the DE to the TTPE, generating, in the TTPE, a validated SER (VSER) on basis of a transaction record (TR) of a corresponding reservation, purchase and/or payment, and a validated and verified specification of a goods or service on basis of the VSER and the TR, and transferring the validated and verified specification of a goods or service from the TTPE to the DE.

A method of providing a simpler electronic receipt to a mobile telecommunication terminal (MTT) of a customer entity (CE) at making a goods and/or service reservation, purchase and/or payment by means of an e-commerce arrangement, and of using the SER for claiming the reserved, purchased and/or paid goods and/or service, the method including the steps of:

at the time of making the goods and/or service reservation, purchase and/or payment:

making, by the CE, a goods or service specifying electronic reservation, purchase and/or payment with a merchant entity (ME), generating, in the ME, a transaction record (TR) on basis of the reservation, purchase and/or payment, and, on basis of the TR, an electronic receipt contract (EC) including an identity (ID) of the ME;

at the time of claiming the goods and/or service reserved, purchased and/or paid:

presenting the SER to a delivery entity (DE) by transferring a copy of the SER from the MTT to the DE, wherein at the time of making the goods and/or service reservation, purchase and/or payment:

transferring a copy of the EC from the ME to a trusted third party entity (TTPE), generating, in the TTPE, a verified EC (VEC) on basis of a verification of the ID of the ME included in the EC, and a simpler electronic receipt (SER) on basis of the VEC, transferring a copy of the SER from the TTPE to the ME, transferring a copy of the SER from the ME to the MTT;

at the time of claiming the goods and/or service reserved, purchased and/or paid:

transferring a copy of the SER from the DE to the TTPE, generating, in the TTPE, a validated SER (VSER) on basis of a transaction record (TR) of a corresponding reservation, purchase and/or payment, and a validated and verified specification of a goods or service on basis of the VSER and the TR, and transferring the validated and verified specification of a goods or service from the TTPE to the DE.

The TR may include: a CE identifier, a MTT identifier, a ME identifier, an identifier of a corresponding EC, a TR identifier, and optionally a goods and/or services specification.

The TR may further include at least one of the following: customer address, customer e-mail, MSISDN number of the mobile phone, credit card number and expiration date, merchant name and ID number, merchant address, merchant e-mail, date and time of contract, contract id, delivery place, earliest delivery date and time, latest delivery date and time, list of items with quantity for each item, unit price, part no and/or total amount paid.

Further steps may include:

converting, in the TTPE, at least a portion of the SER by encryption before executing the step of transferring a copy of the SER from the ME to the MTT; and converting, in the TTPE, an encrypted portion of the SER by decryption after executing the step of transferring a copy of the SER from the DE to the TTPE.

Further steps for providing to the DE a confirmation of a completed delivery of a claimed goods or service may include:

transferring a delivery acknowledge request (DAQ) from the DE to the MTT, transferring a delivery acknowledge confirm (DAF) from the MTT to TTPE, validating, in the MTTE, the DAF, and transferring an indicator of a valid DAF to the DE.

The SER may comprise a EC identifier and a TTPE identifier.

Transferring the SER to the DE may be accomplished by means of wire, a direct contact, infrared or a wireless link.

The wireless link may be a Bluetooth or IEEE 802.11 enabled link.

DETAILED DESCRIPTION

In the following, the invention will be explained by way of embodiment examples and with reference to the accompanying drawings.

Figure 1:
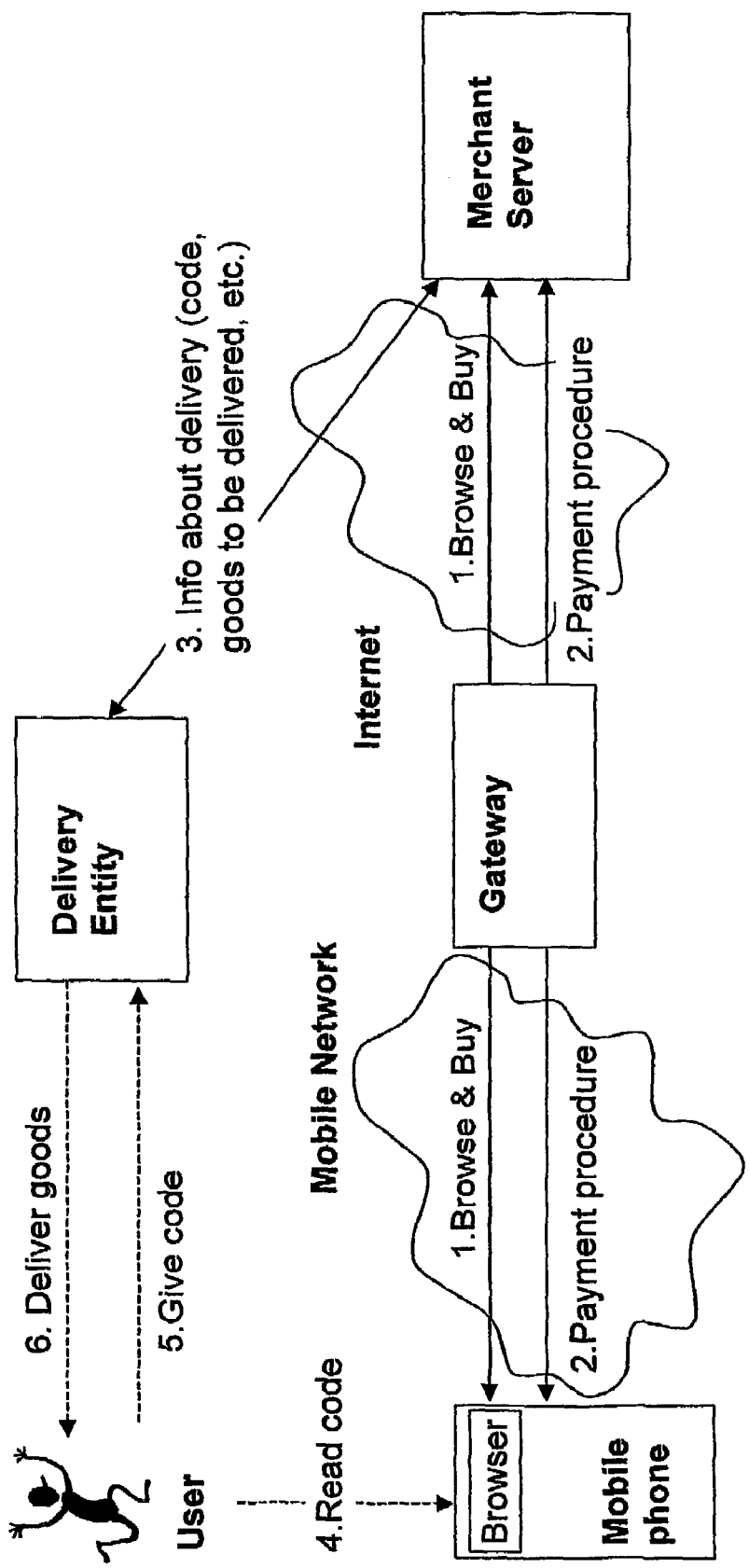
FIG. 1 shows a schematic representation of an e-commerce system and the various procedures involved in its use.
Figure 2:
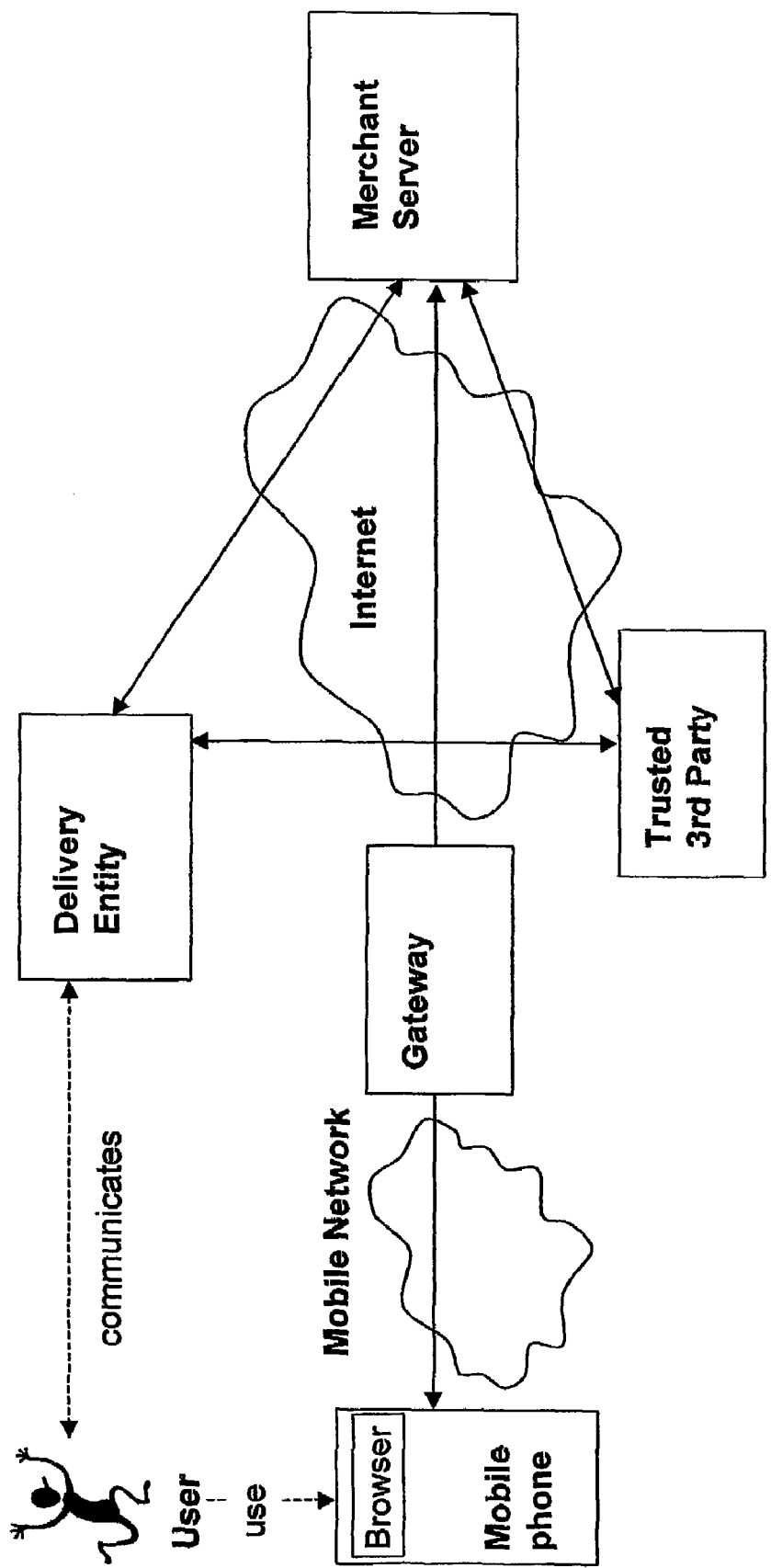
FIG. 2 shows the overall architecture of a mobile e-commerce receipt system.

Referring to FIG. 2, the overall architecture of a mobile e-commerce receipt system is first explained. This system avoids the problems described above, and to at the same time to enable short time goods and/or services delivery that is usually required in mobile e-commerce. The system comprises the following entities:

- Mobile phone with a browser
- Gateway
- Delivery entity terminal
- Trusted Third Party receipt server
- Merchant (Vendor) Server A Trusted Third Party (TTP) receipt server is introduced between the user and the merchant. It acts like a neutral intermediary that gives equal protection to both parties, i.e. the user and merchant. In addition, it enables the short time delivery feature that is required in mobile e-commerce. Since the mobile phone may not have enough capacity for storing the contract, the TTP stores the contract on behalf of the mobile phone and the mobile user. Based on the contract, the TTP will issue and sign a simpler and smaller receipt that can be stored in the mobile phone. This digital receipt is then returned to the merchant's server that sends it to the mobile phone. The digital receipt is stored in the mobile phone and will be used at the delivery of goods and/or services.

Figure 3:
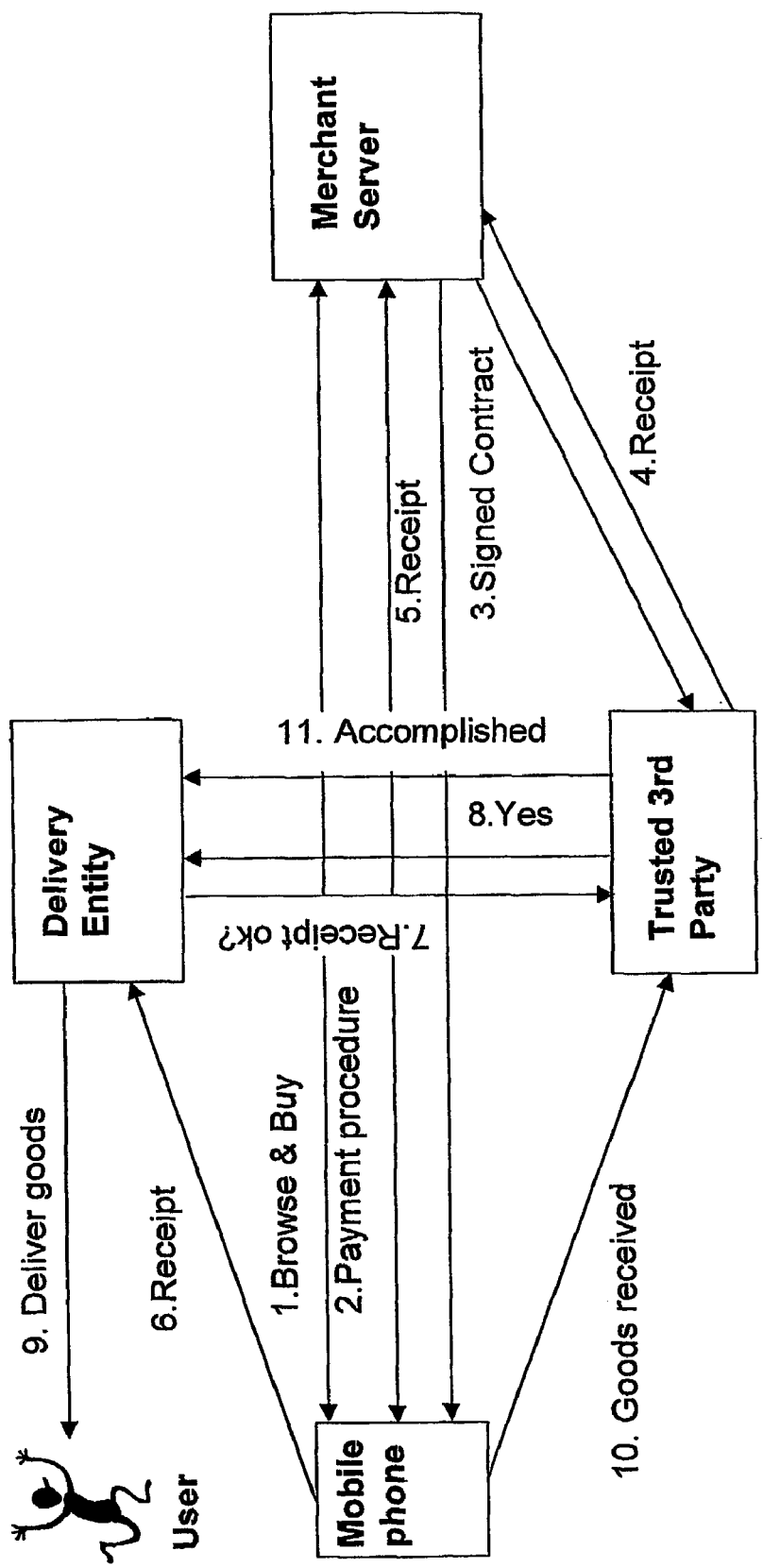
FIG. 3 is an illustration of information flow and the associated steps in a method.

Now, with reference to FIG. 3, the workings of the system is explained. As shown in FIG. 3, the system works as follows:

1. The mobile user browses on his mobile phone and visits a merchant's web site. He selects the items that he wants and makes an order.
2. The payment procedure is carried out. Note that different payment schemes may be used according to the merchant's system and the user's subscription, e.g. prepaid account, credit card, debit card, bank account, etc.
3. The Merchant's server generates and digitally signs the contract using the merchant private key. The contract may contain the following attributes:
   - customer name
   - customer address
   - customer e-mail
   - MISDN number of the mobile phone
   - credit card number and expiration date(in case of payment by credit card)
   - merchant name and ID number
   - merchant address
   - merchant e-mail
   - date and time of contract
   - contract id
   - delivery place (if necessary specify the delivery entities)
   - earliest delivery date and time (if necessary)
   - latest delivery date and time (if necessary)
   - list of items with quantity for each item, unit price, part no
   - total amount paid The contract is then sent to the TTP.
4. The TTP validates the contract to make sure that it is valid and does originate from the corresponding merchant. The validation is done using public key cryptographic functions. If it is the case, the TTP will store it. Based on the digital contract the TTP will then generate and sign a receipt using its private key. This digital receipt may contain the following:
   - contract id
   - TTP id
   - TTP address The TTP will then send it to the merchant's server.
5. The merchant's server sends the digital receipt to the user's mobile phone that stored it.
6. At the delivery counter, the user connects his mobile phone to the delivery entity's terminal. This can be done via a wire, a direct contact, infrared or a wireless link such as Bluetooth, IEEE 802.11, etc. The mobile phone hands over the digital receipt to the delivery entity's terminal.
7. At this stage there are two alternatives depending on the capability of the delivery entity's terminal:
   a. It validates the digital receipt. If valid, it will fetch the corresponding contract either from the merchant's server or from a repository in order to find the list of purchased items. Go over to step 9.
   b. It is not capable to perform the validation of the digital receipt by itself. It will then get in touch with the TTP by using the address specified in the digital receipt and send over the digital receipt for validation.
8. The TTP validates the digital receipt. If valid, the TTP will fetch the corresponding contract by using the contract id specified in the receipt. It will extract the list of purchased items and send it together with an OK back to the delivery entity terminal.
9. The purchased items are delivered to the user. The delivery entity asks the user to acknowledge that he has received the goods and/or services. This can be done via verbal communication between the person in charge of the delivery or via the delivery entity terminal that sends an acknowledge request to the mobile phone via the link between the two devices.
10. The user acknowledges via his mobile phone that the goods and/or services have been delivered to him. The mobile phone sends an acknowledgement to the TTP. The acknowledgement can simply be the digital receipt digitally signed by the mobile phone using the user's private key.
11. The TTP validates the acknowledgement to make sure that it does originate from the right user and is not modified. If valid, the TTP will save it with the corresponding contract. The TTP will then send an OK to the Delivery Entity terminal.

The trade is hence concluded.

The Trusted Third Party receipt server assumes the following responsibilities:

- Ensure that the interests of both parties are equally protected
- Store the contract for the user such that can be used in case of dispute.
- Issue a simpler receipt that can be used in the delivery phase
- Certify that a trade is concluded successfully with a delivery of goods and/or services The Trusted Third Party receipt server has the following functions and capabilities:

- receive and validate contracts signed by merchants
- store and retrieve contracts
- issue and digitally sign receipt based on the received contracts
- validate digital receipts
- validate acknowledgements
- store and retrieve acknowledgements have access to necessary cryptographic function in order to perform signing, verification and validation of receipts and acknowledgement The Delivery Entity's terminal is located at every delivery counter. It assume the following responsibilities:
- accept the digital contract and send it to the TTP for validation
- receive delivery information from the TTP
- ask for delivery acknowledgement The Delivery Entity's terminal has the following capabilities:
- communication with the mobile phones
- communications with the TTP and the merchant's server Certain features of the communications can identified as:
- between TTP and Merchant's server
- between TTP and Delivery Entity's Terminal
- between Delivery Entity's Terminal and Merchant's server
- can go through secure channels on the Internet, i.e. encrypted or through dedicated networks.

The communication between the mobile phone and the TTP goes through the mobile network, the gateway and the Internet.

The communication between the mobile phone and the Delivery Entity's terminal can be via a cable, a socket, or wireless via infrared, Bluetooth, IEEE 802.11.

Advantages

This invention has much merit:
- It enables short time delivery that is required in mobile e-commerce, while not requiring much capability either on the mobile phone or the delivery entity's terminal
- It provides adequate protection to the user. In case of failure in the merchant's system, the contract digitally signed by the merchant, which is stored by the TTP can be retrieved and used as proof. In the case where the mobile phone is broken or stolen the user does not loose the goods and/or services that he has paid for. The privacy of the user is achieved in the sense that information such as identity, personalia, credit card number, bank account, etc. is not revealed at the delivery entity.
- It provides adequate protection to the merchant. It ensures that purchased items cannot be delivered twice since delivery acknowledgements are stored by the TTP.
- It is realisable without requiring much effort and resource.

The invention claimed is:

1. A method of providing a mobile telecommunication terminal (MTT) of a customer entity (CE) with a reliable electronic proof of a reservation, purchase or payment being made by the CE using an e-commerce arrangement, the method including the steps of:
   making, by the CE, an electronic reservation, a purchase or a payment with a merchant entity server (ME), said electronic reservation, purchase or payment specifying a goods or service,
   generating, in the ME, a ME transaction record (METR) on basis of the reservation, purchase or payment, and, on basis of the METR, an electronic contract (EC) including an identity (ID) of the ME, and an EC identifier not containing any information about the reservation, purchase or payment,
   transferring a copy of the EC from the ME to a trusted third party entity server (TTPE),
   generating, in the TTPE, a verified EC (VEC) on basis of a verification of the ID of the ME included in the EC, and an electronic receipt (SER) not containing any information about the reservation, purchase, or payment on basis of the VEC,
   transferring a copy of the SER from the TTPE to the ME, and
   transferring via a mobile a mobile network a copy of the SER from the ME to the MTT,
   wherein the SER comprises the EC identifier, a TTPE identifier, and a TTPE access address.

2. The method of claim 1, including the further steps of:
   presenting the SER to a delivery entity (DE) by transferring a copy of the SER from the MTT to the DE,
   transferring a copy of the SER from the DE to the TTPE,
   generating, in the TTPE, a validated SER (VSER) on basis of a TTPE transaction record (TTPETR) of a corresponding reservation, purchase or payment, and a validated and verified specification of a goods or service on basis of the VSER and the TR, and
   transferring the validated and verified specification of a goods or service from the TTPE to the DE.

3. The method of claim 1, including the further steps of:
   a1) at the time of making the goods or service reservation, purchase or payment: making, by the CE, a goods or service specifying electronic reservation, purchase or payment with a merchant entity (ME), generating, in the ME, a ME transaction record (METR) on basis of the reservation, purchase or payment, and, on basis of the METR, an electronic receipt contract (EC) including an identity (ID) of the ME;
   b1) at the time of claiming the goods or service reserved, purchased or paid: presenting the SER to a delivery entity (DE) by transferring a copy of the SER from the MTT to the DE, wherein
   a2) at the time of making the goods or service reservation, purchase or payment:
   transferring a copy of the EC from the ME to a trusted third party entity (TTPE), generating, in the TTPE, a verified EC (VEC) on basis of a verification of the ID of the ME included in the EC, and an electronic receipt (SER) on basis of the VEC, transferring a copy of the SER from the TTPE to the ME, transferring a copy of the SER from the ME to the MTT; and
   b2) at the time of claiming the goods or service reserved, purchased or paid: transferring a copy of the SER from the DE to the TTPE, generating, in the TTPE, a validated SER (VSER) on basis of a ITPE transaction record (TTPETR) of a corresponding reservation, purchase or payment, and a validated and verified specification of a goods or service on basis of the VSER and the TTPETR, and transferring the validated and verified specification of a goods or service from the TTPE to the DE.

4. The method of claim 1, wherein the METR or the TTPETR includes: a CE identifier, a MIT identifier, a ME identifier, an identifier of a corresponding EC, a TR identifier, and optionally, a goods specification or a services specification.

5. The method of claim 4, wherein the METR or the TTPETR further includes at least one of the following: customer address, customer e-mail, MSISDN number of the mobile phone, credit card number and expiration date, merchant name and ID number, merchant address, merchant e-mail, date and time of contract, contract id, delivery place, earliest delivery date and time, latest delivery date and time, list of items with quantity for each item, unit price, part no, and total amount paid.

6. The method of claim 3, including that the further steps of:
   converting, in the TTPE, at least a portion of the SER by encryption before executing the step of transferring a copy of the SER from the ME to the MTT; and converting, in the TTPE, an encrypted portion of the SER by decryption after executing the step of transferring a copy of the SER from the DE to the TTPE.

7. The method of claim 2, including the further steps for providing to the DE a confirmation of a completed delivery of a claimed goods or service:
transferring a delivery acknowledge request (DAQ) from the DE to the MTT,
transferring a delivery acknowledge confirm (DAF) from the MTT to TTPE,
validating, in the MTTE, the DAF, and
transferring an indicator of a valid DAF to the DE.

8. The method of claim I, wherein the SER comprises a EC identifier and a TTPE identifier.

9. The method of claim 2, wherein transferring the SER to the DE is accomplished by means of wire, a direct contact, infrared or a wireless link.

10. The method of claim 9, wherein the wireless link is a Bluetooth or IEEE 802.11 enabled link.

11. The method of claim 2, wherein the EC constitutes the TTPETR.

12. Apparatus for providing a mobile telecommunication terminal (MTT) of a customer entity (CE) with a reliable electronic proof of a reservation, purchase or payment being made by the CE using an e-commerce arrangement, comprising:
a merchant entity server (ME) arranged to:
make an electronic reservation, a purchase, or a payment with, said electronic reservation, purchase, or payment specifying a goods or service,
generate a ME transaction record (METR) on basis of the reservation, purchase or payment, and, on basis of the METR, an electronic contract (EC) including an identity (ID) of the ME, and an EC identifier not containing any information about the reservation, purchase or payment,
transfer a copy of the EC from the ME to a trusted third party entity server (TTPE),
wherein the TTPE is arranged to generate a verified EC (VEC) on basis of a verification of the ID of the ME included in the EC, and an electronic receipt (SER) not containing any information about the reservation, purchase, or payment on basis of the VEC and transfer a copy of the SER from the TTPE to the ME,
wherein the ME is arranged to transfer a copy of the SER from the ME to the MTT, and
wherein the SER comprises the EC identifier, a TTPE identifier, and a TTPE access address.

13. The apparatus of claim 12, wherein the MTT is arranged to present the SER to a delivery entity (DE) by transferring a copy of the SER to the DE, wherein the DE is arranged to transfer a copy of the SER from the DE to the TTPE, and
wherein the TTPE is arranged to generate a validated SER (VSER) on basis of a TTPE transaction record (TTPETR) of a corresponding reservation, purchase or payment, and a validated and verified specification of a goods or service on basis of the VSER and the TR and to transfer the validated and verified specification of a goods or service from the TTPE to the DE.

14. The apparatus of claim 12, wherein at the time of making the goods or service reservation, purchase or payment, the ME is arranged to received from the CE, a goods or service specifying electronic reservation, purchase or payment and to generate a ME transaction record (METR) on basis of the reservation, purchase or payment, and, on basis of the METR, an electronic receipt contract (EC) including an identity (ID) of the ME, and
wherein at the time of claiming the goods or service reserved, purchased, or paid, the MTT is arranged to present the SER to a delivery entity (DE) by transferring a copy of the SER to the DE, and
wherein at the time of making the goods or service reservation, purchase, or payment, the ME is arranged to transfer a copy of the EC to a trusted third party entity (TTPE);
wherein the TTPE is arranged to generate a verified EC (VEC) on basis of a verification of the ID of the ME included in the EC, and an electronic receipt (SER) on basis of the VEC and to transfer a copy of the SER to the ME and the ME is arranged to transfer a copy of the SER to the MTT;
wherein at the time of claiming the goods or service reserved, purchased, or paid, the DE is arranged to transfer a copy of the SER to the TTPE;
wherein the TTPE is arranged to generate a validated SER (VSER) on basis of a TTPE transaction record (TTPETR) of a corresponding reservation, purchase, or payment, and a validated and verified specification of a goods or service on basis of the VSER and the TTPETR and to transfer the validated and verified specification of a goods or service to the DE.

15. The apparatus of claim 12, wherein the METR or the TTPETR includes: a CE identifier, a MTT identifier, a ME identifier, an identifier of a corresponding EC, a TR identifier, and optionally, a goods specification or a services specification.

16. The apparatus of claim 12, wherein the METR or the TTPETR further includes at least one of the following: customer address, customer e-mail, MSISDN number of the mobile phone, credit card number and expiration date, merchant name and ID number, merchant address, merchant e-mail, date and time of contract, contract id, delivery place, earliest delivery date and time, latest delivery date and time, list of items with quantity for each item, unit price, part no, and total amount paid.

17. The apparatus of claim 14, wherein the TTPE is arranged to convert at least a portion of the SER by encryption before executing the step of transferring a copy of the SER from the ME to the MTT and to convert an encrypted portion of the SER by decryption after executing the step of transferring a copy of the SER from the DE to the TTPE.

18. The apparatus of claim 12, wherein the SER comprises a EC identifier and a TTPE identifier.

19. The apparatus of claim 12, wherein the EC constitutes the TTPETR.

* * * * *

UNITED STATES PATENT AND TRADEMARK OFFICE
CERTIFICATE OF CORRECTION

| | | |
|---|---|---|
| PATENT NO. | : 7,685,020 B2 | Page 1 of 1 |
| APPLICATION NO. | : 10/275697 | |
| DATED | : March 23, 2010 | |
| INVENTOR(S) | : Do et al. | |

It is certified that error appears in the above-identified patent and that said Letters Patent is hereby corrected as shown below:

In Column 2, Line 31, delete "user s" and insert -- user --, therefor.

In Column 8, Line 43, in Claim 3, delete "ITPE" and insert -- TTPE --, therefor.

In Column 8, Line 50, in Claim 4, delete "MIT" and insert -- MTT --, therefor.

In Column 9, Line 13, in Claim 8, delete "claim I," and insert -- claim 1, --, therefor.

Signed and Sealed this
Sixteenth Day of August, 2011

David J. Kappos
*Director of the United States Patent and Trademark Office*